P. FRITZ.
ICE CREAM DISPENSING MACHINE.
APPLICATION FILED OCT. 27, 1917.
1,269,699.
Patented June 18, 1918.
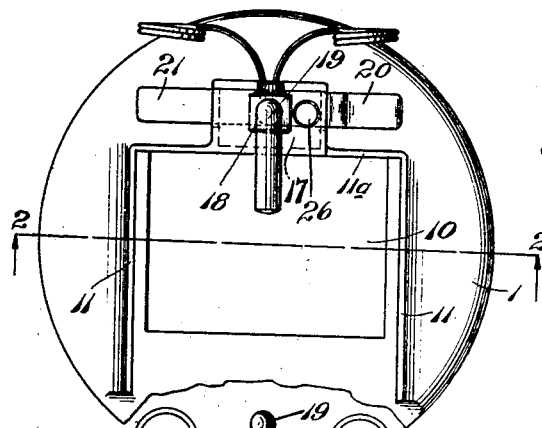
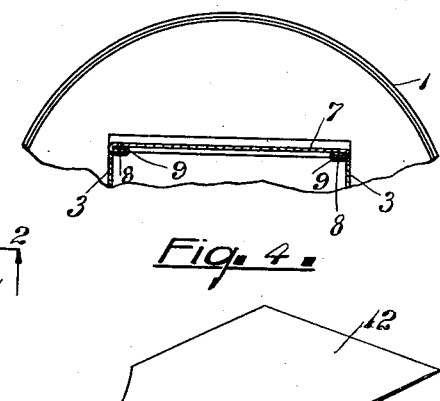
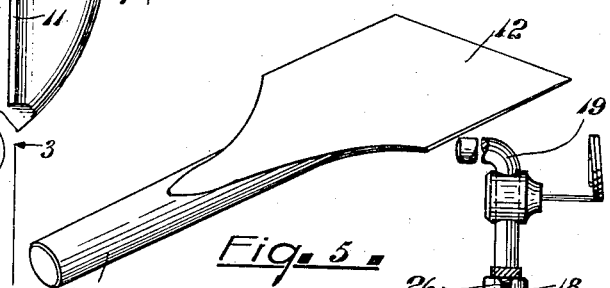
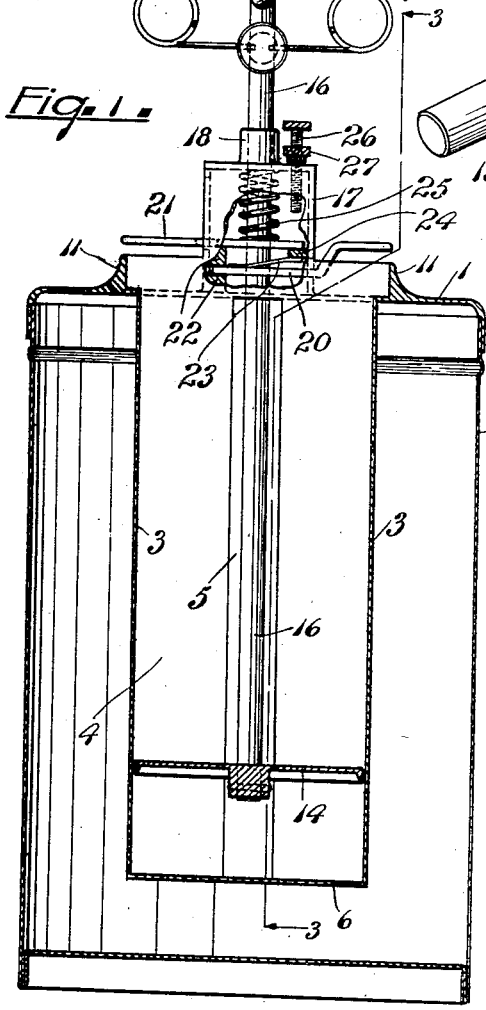
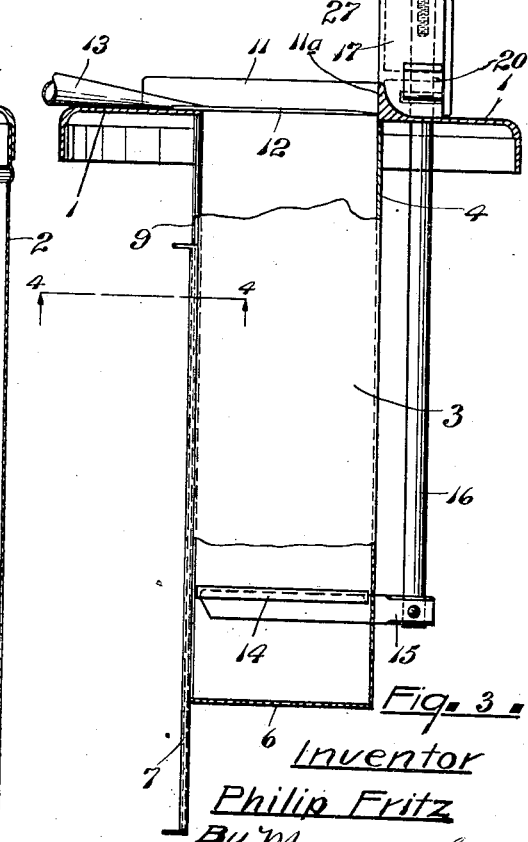
Inventor
Philip Fritz
By Moulton & Linnave
Attorneys.

UNITED STATES PATENT OFFICE.

PHILIP FRITZ, OF GRAND RAPIDS, MICHIGAN.

ICE-CREAM-DISPENSING MACHINE.

1,269,699.  Specification of Letters Patent.  Patented June 18, 1918.

Application filed October 27, 1917. Serial No. 198,794.

*To all whom it may concern:*

Be it known that I, PHILIP FRITZ, a citizen of the United States of America, residing at Grand Rapids, in the county of Kent and State of Michigan, have invented certain new and useful Improvements in Ice-Cream-Dispensing Machines; and I do hereby declare the following to be a full, clear, and exact description of the invention, such as will enable others skilled in the art to which it appertains to make and use the same.

This invention relates to an ice cream dispensing apparatus, particularly to a mechanism for dispensing ice cream in slices of greater or less thickness, the same being cut from the well known ice cream brick. It is an object and purpose of my invention to provide a mechanism of this character which is simple and effective in operation, can be produced at a relatively low cost of manufacture, and in which an ice cream brick can be at all times subject to refrigerating action so that it will maintain its shape and not melt as it does when exposed to the atmosphere at ordinary temperatures.

The mechanism by which I attain these results, together with many others not specifically enumerated, is disclosed in the accompanying drawing in which:

Figure 1 is a plan view of the dispensing machine, it being partially broken away on account of lack of space.

Fig. 2 is a vertical section substantially on the plane of the line 2—2 of Fig. 1, with parts of the machine back of said plane broken away to disclose the inner mechanism.

Fig. 3 is a vertical section substantially on the line 3—3 of Fig. 2.

Fig. 4 is a section on the line 4—4 of Fig. 3 looking in the direction indicated by the arrows, and Fig. 5 is a perspective view of the slicing knife forming one element of the machine.

Like reference characters refer to like parts in the several views of the drawing.

In construction a cover 1 is provided which may be of any suitable form adapting it to close the upper end of any suitable receptacle, such as that indicated at 2, this receptacle being designed to have refrigerating material placed around it in any suitable manner so that the temperature within the receptacle is below that of the normal freezing point of water. Depending from the cover 1 is an elongated receptacle of substantially rectangular cross section having sides 3, which join with a back 4 slotted substantially its full length, as indicated at 5, a bottom 6, and a removable front side 7, the same being provided with an inturned lip 8 at each side edge slidably received in U-shaped guides 9 formed at the front edges of the sides 3. The cover has an opening 10 cut therethrough to permit entrance into this receptacle depending from the cover, whereby an ice cream brick may be entered therein. The cover 1 is also formed with upstanding parallel side guides 11, one at each side of the opening 10, which join with an upwardly projecting stop 11ª directly back of the opening. Between the guides 11 a slicing knife 12 may be entered and moved to the rear until stopped by the stop 11ª. For convenience in handling the knife, it is formed with a handle 13 as shown in Fig. 5. Normally, in the use of the mechanism, the knife is placed over the opening 10, as shown in Fig. 3, except during the time that the brick is being cut thereby. This precludes the entrance of warmer air into the brick-holding receptacle.

A platform 14 is located within the receptacle and carried on a bar 15 which extends to the rear through the slot 5, having connection to the lower end of a rod 16, the same being located back of the receptacle and extending upwardly through a housing 17 and a guide 18, cast on the upper side of the housing as shown, said rod above the guide 18 being turned to the rear to form a handle 19. The housing 17 is located directly back of the opening 10 in the cover 1 and, preferably, is cast integral with the cover. Two levers, 20 and 21, are located in the housing extending in opposite directions through the sides of the same, and the rod 16 passes through both of them, the openings in said levers being slightly larger in diameter than the diameter of the rod 16. The lowermost lever 20 at its inner end is received between upper and lower inwardly projecting lugs 22 located on the inside of the housing and is normally pressed in a downward direction by a leaf spring 23, so that it engages against the rod 16 and resists downward movement of said rod, but freely permits the upward movement thereof when any force is applied to the rod to elevate it, as for instance, by grasping the handle 19 and lifting the same. Spring 23 is interposed between the lever 20 and a projection 24 as shown in Fig. 2. The upper lever 21 normally lies in a horizontal plane on and above the upper lug 22 and the projection 24, and is normally held thereagainst by a weak coil spring 25 surrounding the rod 16 and interposed between the top of the housing 17 and said lever. In practice the outer end of the lever 21 may be grasped and elevated, this causing the lever to engage against a side of the rod so that the rod is elevated with the lever until said lever strikes against a stop provided by a screw 26 threaded through the upper side of the housing 17, and adapted to be locked in any position to which it may be adjusted by the lock nut 27.

In the use of this mechanism, a brick is placed on the platform 14 within the receptacle, and normally said platform is located in the lower part of the receptacle with the knife 12 covering the opening 10. When slices are to be removed from the brick, the first operation is to grasp the handle 19 and elevate the rod 16 and attached platform 14 until the brick strikes against the knife 12. The knife is then removed and lever 21 is grasped and elevated until it strikes against the lower end of screw 26, it being understood that at all times after the elevation of the rod 16, it is held in place by lever 20. The knife may then be moved between guides 11 toward the stop 11ª to cut a slice from the brick and if more than one slice is desired, the operation may be repeated until the requisite amount has been removed. Thereupon, by slightly elevating the outer end of lever 20, the rod and attached platform are free to move downwardly to carry the remainder of the brick to lower position where the temperature is lower, the knife 12 being replaced over the opening 10. At any time thereafter, the operation may be repeated for the removal of slices from the brick, the knife serving as a gage to bring the brick to upper position previous to operating the lever 21 to elevate the brick above the cover 1 for removal of a slice therefrom. It is obvious that the thickness of the slices may be regulated by adjustment of the screw 26.

The sale of ice cream in relatively thin slices, in what is known as ice cream sandwiches, is now common and well known. This machine is very efficient for such dispensing of ice cream, the cream being readily removed from a brick in slices of any desired thickness and, at the same time, the brick is subject to refrigeration so that the same does not melt and become soft and unsightly in appearance, together with the loss of considerable of the material in the brick. Various modifications in detail of construction may be resorted to without departing from my invention and I consider myself entitled to all such modifications as fall within the scope of the appended claims defining the invention.

I claim:

1. An ice cream dispensing device comprising a supporting top or cover having an opening therethrough, a receptacle suspended from said cover below the opening, a brick carrying device located within the receptacle, means to elevate said device a predetermined amount from above the top or cover, and means adjustably mounted on said cover for engaging with said elevating means to limit the extent of elevation of the brick carrying device, substantially as described.

2. An ice cream dispensing device comprising a top member having an opening therethrough, a receptacle suspended from the top below said opening, a brick carrying device located within the receptacle, manually operable means to elevate said device a predetermined amount with each operation thereof from above the top, and separate means automatically operable to hold releasably said device in any position to which it is raised, substantially as described.

3. A dispensing device comprising an upper member having an opening therethrough, guide ribs on said member paralleling the sides of the opening, a stop at the rear side of the opening, a receptacle depending from the member below the opening, a brick carrying device within the receptacle, means operable at a point above said member for successively elevating said device a predetermined amount, and releasable means for holding the device in any position to which it may be raised, substantially as described.

4. A dispensing device comprising an upper member having an opening therethrough, a receptacle depending from the member below the opening, said receptacle having a vertical slot in its rear side, a carrying member located within the receptacle, a rod slidably mounted on said upper member back of the receptacle and extending above the upper member, connections between the rod and the carrying member within the receptacle, means to engage with the rod to hold the same in any position to which it may be raised, said means freely permitting elevation of said rod, manually operable means for engaging the rod to elevate the same, and an adjustable stop disposed in the path of movement of said manually operable means to limit the extent of elevation of the rod and adjustable to change the amounts that the rod may be elevated with each operation of its operating means, substantially as described.

5. A dispensing device comprising an upper member having an opening therein, a receptacle depending from the member below the opening, said receptacle having a vertical slot in its rear side, a carrying member located within the receptacle, a rod located back of said slot in the receptacle, means extending through the slot and connecting the rod and said carrying member, a housing on the upper member through and above which said rod slidably passes, and a lever mounted in the housing and extending through one side thereof through which the rod passes, said lever normally holding the rod against downward movement but freely permitting upward movement thereof, substantially as described.

6. A device of the character described containing the elements claimed in combination in claim 5, combined with a second lever mounted in the housing and extending through the opposite side thereof, said lever having limited movement in an upward direction and engaging with the rod to lift the same on upward movement thereof.

7. A dispensing device containing the elements claimed in combination in claim 5, combined with a second lever mounted in the housing above the first mentioned lever and extending through the opposite side of said housing, said lever being mounted for movement in an upward direction and engaging with the rod to carry the same with it on such upward movement, and an adjustably mounted stop on the housing interposed in the path of movement of said second lever to determine the amount of upward movement thereof, substantially as described.

In testimony whereof I affix my signature.

PHILIP FRITZ.

Copies of this patent may be obtained for five cents each, by addressing the "Commissioner of Patents, Washington, D. C."